United States Patent
Tan et al.

(10) Patent No.: US 8,252,620 B2
(45) Date of Patent: Aug. 28, 2012

(54) PROCESS FOR IMPREGNATING PHOTOSENSITIZING DYE ONTO CONDUCTIVE SUBSTRATE OF PHOTOANODE OF A SOLAR CELL

(75) Inventors: Chung-Sung Tan, Hsinchu (TW); I-Hsiang Lin, Hsinchu (TW); Jan-Min Yang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 259 days.

(21) Appl. No.: 12/805,610

(22) Filed: Aug. 10, 2010

(65) Prior Publication Data
US 2011/0263071 A1 Oct. 27, 2011

(30) Foreign Application Priority Data
Apr. 26, 2010 (TW) ............................. 99113121 A

(51) Int. Cl.
*H01L 21/00* (2006.01)
(52) U.S. Cl. ................ 438/85; 438/48; 438/54; 438/57; 438/104; 257/E21.29; 257/E27.124; 427/74; 427/517
(58) Field of Classification Search .............. 438/48, 438/54, 57, 85, 104; 257/E21.29, E27.124; 427/74, 517
See application file for complete search history.

(56) References Cited

U.S. PATENT DOCUMENTS

| | | |
|---|---|---|
| 2008/0230774 A1* | 9/2008 | Hirai ............................. 257/40 |
| 2009/0025793 A1* | 1/2009 | Kim et al. ..................... 136/262 |
| 2009/0090411 A1* | 4/2009 | Choi et al. .................... 136/252 |
| 2010/0019319 A1* | 1/2010 | Hirai ............................ 257/347 |
| 2010/0307593 A1* | 12/2010 | Thimsen et al. ............. 136/263 |
| 2011/0294974 A1* | 12/2011 | Ohta et al. ................ 526/303.1 |

\* cited by examiner

*Primary Examiner* — Thanh V Pham
(74) *Attorney, Agent, or Firm* — Bacon & Thomas, PLLC

(57) ABSTRACT

The present invention provides a process for preparing a photoanode of a dye-sensitized solar cell (DSSC) by pressure swing impregnation, which includes impregnating a metal oxide layer on a conductive substrate in a photosensitizing dye solution in a vessel; introducing a pressurized inert gas into the vessel to maintain a first pressure therein for a period of time, wherein the first pressure can be lower or higher than the critical pressure of the inert gas and the solution is expanded by the inert gas; further pressurizing the vessel with the inert gas and maintaining at a second pressure higher than the first pressure for a period of time, wherein the inert gas becomes sub-critical or supercritical fluid and dissolves more in the solution, creating an anti-solvent effect, so that the photosensitizing dye further deposits onto the metal oxide layer due to the anti-solvent effect.

26 Claims, 1 Drawing Sheet

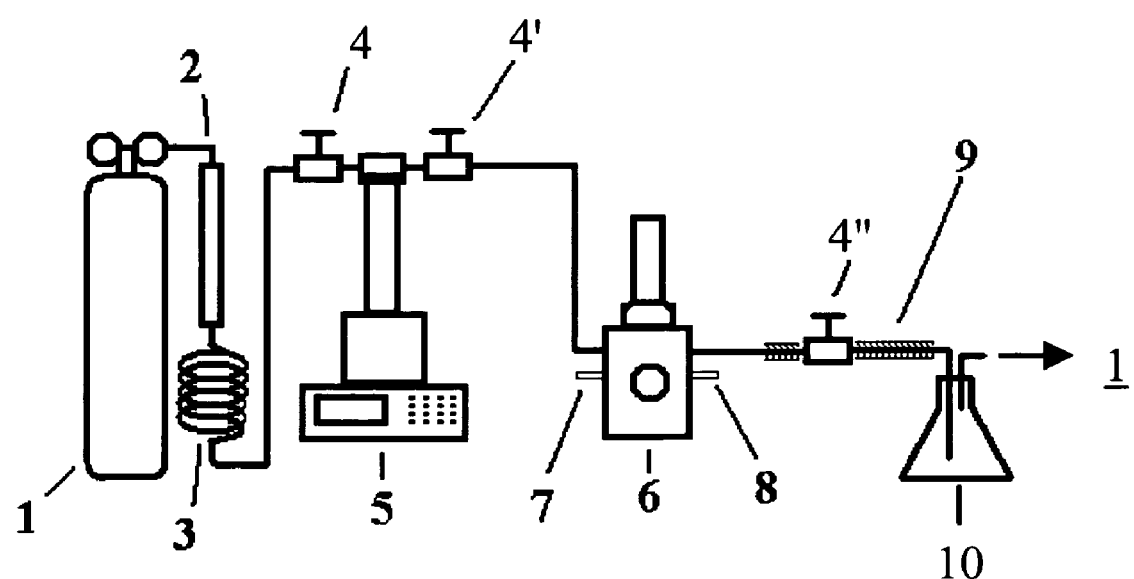

PROCESS FOR IMPREGNATING PHOTOSENSITIZING DYE ONTO CONDUCTIVE SUBSTRATE OF PHOTOANODE OF A SOLAR CELL

FIELD OF THE INVENTION

The present invention relates to a process for preparing a photoanode of a dye-sensitized solar cell (DSSC), and more particularly to a process for impregnating photosensitizing dye onto a conductive substrate of a photoanode.

BACKGROUND OF THE INVENTION

The dye-sensitized solar cells (DSSCs) were originally developed by M. Gratzel, hence they are also called the Gratzel cells. Essentially, a DSSC is comprised of a photoanode, electrolyte, and platinum electrodes. The photoanode is basically constructed of a transparent and conductive glass substrate having a conductive surface of a layer of ITO or FTO over the glass substrate, a semiconductor film having titanium dioxide ($TiO_2$) particles on the conductive surface of the conductive glass substrate, and photosensitizing dye adsorbed onto the semiconductor film.

Currently, a photosensitizing dye can be adsorbed onto the photoanode of a DSSC by using either the method of conventional impregnation (atmospheric pressure) or the method of supercritical fluid impregnation.

For the method of conventional impregnation, the rate at which a photosensitizing dye solution enters into pores is rendered slower as it is affected by the viscosity and surface tension of the photosensitizing dye solution. As for the method of supercritical fluid impregnation, highly pressurized $CO_2$ is used as a solvent, and a co-solvent is also added thereinto to increase the solubility thereof, because the solubility of photosensitizing dye in the highly pressurized $CO_2$ is generally low. Consequently, the highly pressurized $CO_2$ and the co-solvent are combined to give rise to a mixed fluid, which possesses lower surface tension and viscosity than the solvent used in the conventional impregnation, and thus encounters less mass transfer resistance when photosensitizing dye molecules diffuse into the pores. However, the solubility of organic dyes in supercritical fluids even with the co-solvent are still low, which means the solution contains low saturated concentration of photosensitizing dye, thereby undermining the effects of impregnation.

In other words, the search for a process for preparing a DSSC photoanode with high photosensitizing dye adsorption is still being continuously undertaken by the industry.

SUMMARY OF THE INVENTION

A primary objective of the present invention is to provide a process for impregnating a photosensitizing dye for a DSSC photoanode onto a conductive substrate. This process contains two major steps. The first step which is under a lower pressure is used to increase diffusion rate of photosensitizing dye into the pores of photoanode. The purpose of this step is to decrease the surface tension and viscosity of photosensitizing dye solution. The second step which is under a higher pressure is used to create an anti-solvent effect. The purpose of this step is to force photosensitizing dye deposit onto the photoanode, causing photosensitizing dye molecules adsorbed by pore surface. Thereby this process can enhance the overall photoelectric conversion efficiency of the DSSC.

Another objective of the present invention is to provide a process for preparing a DSSC photoanode, wherein the process for impregnating photosensitizing dye according to the invention is used.

A further objective of the present invention is to provide a DSSC photoanode having high photosensitizing dye adsorption.

To accomplish the aforesaid objectives of the invention, the present invention has proposed a process for impregnating photosensitizing dye onto a conductive substrate of photoanode, said photoanode comprising a transparent conductive substrate, a metal oxide layer deposited on a conductive surface of the conductive substrate, and a photosensitizing dye adsorbed on the metal oxide layer, said process comprising the following steps:

a) preparing a conductive substrate having a metal oxide layer deposited on a conductive surface thereof;

b) impregnating the metal oxide layer of the conductive substrate in a solution of photosensitizing dye in a high-pressure vessel;

wherein the improvement comprises the process further comprising the following steps:

c) introducing an inert gas into the vessel to maintain a first pressure therein for a period of time, wherein the first pressure being lower or greater than the critical pressure of the inert gas and the solution is expanded by the inert gas; and d) further pressurizing the vessel with the inert gas and maintaining at a second pressure higher than the first pressure for a period of time, wherein the inert gas becomes subcritical or supercritical fluid and dissolves more into the solution, creating an anti-solvent effect, so that the photosensitizing dye is further deposited onto the metal oxide layer due to the anti-solvent effect.

Preferably, the process of the present invention, following to step d), further comprises:

e) repeatedly carrying out steps c) and d) in sequence by repeatedly releasing the inert gas from the vessel and introducing the inert gas into the vessel in sequence.

Preferably, steps c) and d) are repeatedly carried out one to three cycles in total.

The first pressure depends on the operation temperature. At a fixed pressure, the expansion volume of a solution decreases with the increasing operation temperature. For that reason, an operation at a higher temperature needs a higher first pressure than that for the operating at a lower temperature in order to create the same expansion volume of the solution. The first pressure is usually lower than the critical pressure of the inert gas, but the first pressure can be higher than the critical pressure for operation at high temperatures.

The second pressure in the vessel is required to be higher than the first pressure. The second pressure also depends on the operation temperature. The temperature of the inert gas in the vessel in step d) can either be higher or lower than the critical temperature of the inert gas, depending on the solubility of photosensitizing dye in organic solvent at various temperatures at atmospheric pressure.

Preferably, a temperature of the inert gas in the vessel in step c) is higher than the critical temperature of the inert gas.

Preferably, a temperature of the inert gas in the vessel in step c) is lower than the critical temperature of the inert gas.

Preferably, a temperature of the inert gas in the vessel in step d) is higher than the critical temperature of the inert gas.

Preferably, a temperature of the inert gas in the vessel in step d) is lower than the critical temperature of the inert gas.

Preferably, the inert gas is carbon dioxide.

Preferably the inert gas is carbon dioxide, the first pressure is of 300-1200 psi, and the second pressure is of 1000-3600 psi. More preferably, the first pressure is of about 900 psi and the second pressure is of about 1800 psi for the operation temperature of 40° C.; or the first pressure is of about 835 psi and the second pressure is of about 1240 psi for the operation temperature of 30° C. The conditions of the examples are only served as the purpose of illustration, not to be used to limit the present invention.

Preferably, the period of time in step c) is of 0.50-10.0 hours, and the period of time in step d) is of 0.10-2.0 hours.

Preferably, the metal oxide layer is an oxide or a mixed oxide selected from the group consisting of titanium, niobium, hafnium, indium, tin, and zinc.

Preferably, the conductive surface of the conductive substrate is a glass substrate coated with a layer of indium tin oxide (ITO), fluorine-doped tin oxide (FTO), $ZnO$—$Ga_2O_3$, $SnO_2$—$Sb_2O_3$ or a combination thereof.

Preferably, the photosensitizing dye solution is an organic solvent solution, and said organic solvent is able to dissolve the photosensitizing dye and the solution thereof is able to be expanded by $CO_2$ in Step c). More preferably, the organic solvent is an alcohol, arene, aliphatic alkane, acetonitrile, acrylonitrile, or a mixture thereof. Most preferably, the organic solvent is an alcohol or a mixed solvent containing an alcohol. In one of the preferred embodiments of the present invention, the organic solvent is ethyl alcohol.

Preferably, the process of the present invention, following to step d), further comprises d'): releasing the inert gas from the vessel to a pressure inside the vessel which is about equal to the first pressure, and maintaining the pressure for a period of time.

Preferably, the process of the present invention, following to step d), further comprises: f) releasing the inert gas from the vessel to a trap device where the solution entrained in the inert gas is collected by the trap device; g) taking out the conductive substrate from the vessel; and h) recovering the solution from the vessel and from the trap device. More preferably, the process of the present invention, further comprises recycling the inert gas in the gaseous form exiting from the trap device as a source of the inert gas introduced into the vessel in step c).

Preferably, the process of the present invention, following to step e), further comprises: f) releasing the inert gas from the vessel to a trap device where the solution entrained in the inert gas is collected by the trap device; g) taking out the conductive substrate from the vessel; and h) recovering the solution from the vessel and from the trap device.

Preferably, the process of the present invention, following to step d'), further comprises: f) releasing the inert gas from the vessel to a trap device where the solution entrained in the inert gas is collected by the trap device; g) taking out the conductive substrate from the vessel; and h) recovering the solution from the vessel and from the trap device.

BRIEF DESCRIPTION OF DRAWINGS

FIG. 1 is a schematic view showing an apparatus suitable for carrying out the pressure swing impregnation process of the present invention.

DETAILED DESCRIPTION OF THE INVENTION

The present invention has disclosed a process for preparing a photoanode for a DSSC, and more particularly a process for impregnating photosensitizing dye onto a metal oxide layer of a conductive surface on a transparent conductive glass substrate, which has advantages such as higher photosensitizing dye adsorption, thereby increasing the photoelectric conversion efficiency of the DSSC.

According to a preferred embodiment of the invention, $CO_2$ and the organic solutions containing photosensitizing dye were employed to carry out pressure swing impregnation. In this method, a metal oxide layer on a conductive surface of a transparent conductive glass substrate was impregnated in a photosensitizing dye solution in an vessel, and then $CO_2$ was pumped into the vessel and maintained at a first pressure therein (which is called the low pressure end hereafter); said first pressure was chosen within a range which triggers the expansion of the organic solution while the anti-solvent effect is not significant. Said first pressure was usually lower than the critical pressure of $CO_2$, but it can also be higher than the critical pressure of $CO_2$ depending on the operation temperature, and the viscosity and the surface tension of the solution were both reduced. Therefore, the mass transfer resistance in the solution in the pores in said metal oxide layer was reduced, which in turn enhances the diffusion rate of the photosensitizing dye into the pores, as well as the adsorption of the photosensitizing dye onto the metal oxide layer consequently. Next, the higher $CO_2$ pressure was pumped into the vessel and maintained at a second pressure therein (which is called the high pressure end hereafter). Preferably, said second pressure was close to or greater than the critical pressure of $CO_2$, which resulted in the absorption of a large amount of $CO_2$ by the solution, and built up a strong anti-solvent effect consequently, such that a greater portion of photosensitizing dye dissolved in the solution within the pores was precipitated out of the solution due to the anti-solvent effect, and became adsorbed within the pores. Thereafter, the pressure was returned to the low pressure end, hence reducing the anti-solvent effect and allowing a portion of photosensitizing dye that was not adsorbed and precipitated outside of the pores in the metal oxide layer to be re-dissolved in the solution. Because the photosensitizing dye concentration of the solution outside of the pores in the metal oxide layer was higher than that inside of the pores, the photosensitizing dye was allowed to diffuse into the pores and became adsorbed. Moreover, due to the fact that the photosensitizing dye became adsorbed to the metal oxide layer by bonding, the photosensitizing dye adsorbed onto the metal oxide layer could not be re-dissolved into the solution when the pressure was returned to the low pressure end, if the equilibrium adsorption has not been reached. In addition, the adsorption of photosensitizing dye was further increased because the high photosensitizing dye concentration outside of the pores would facilitate photosensitizing dye diffusion into the pores. As the pressure was swung back and forth between low pressure and high pressure repeatedly, photosensitizing dye impregnation was effectively enhanced.

The present invention will be more clearly understood when considered in conjunction with the accompanying embodiments, which only serve the purpose of illustration, and are not to be used to limit the scope of the present invention.

Example

FIG. 1 is a schematic view showing an apparatus suitable for the process of the present invention, wherein components or devices represented by numbers are listed as follows:

| | |
|---|---|
| 1: | $CO_2$ tank |
| 2: | moisture removal tube |
| 3: | cooling coil |
| 4, 4', 4": | needle valves |

-continued

| | |
|---|---|
| 5: | syringe pump and main control panel |
| 6: | high-pressure vessel (comprising stirring motor therein) |
| 7: | thermometer |
| 8: | pressure gauge |
| 9: | heating tape |
| 10: | cold trap |

A photoanode and a photosensitizing dye solution were placed into a vessel 6, in order to carry out the conventional impregnation (atmospheric pressure), $CO_2$ supercritical fluid impregnation, and the $CO_2$ pressure swing impregnation according to this invention. The commercial name for the photosensitizing dye was D719, while a solvent used herein was absolute ethyl alcohol, and the photosensitizing dye was used at a concentration of $3.4 \times 10^{-4}$ M.

A solar simulator (Yss-150A/Yamashita Denso/JPN) was used to illuminate a DSSC at an illumination intensity of AM 1.5, and the photoelectric conversion efficiency was calculated after obtaining the $J_{sc}$, $V_{oc}$, and FF values by measurement.

The formula for calculating photoelectric conversion efficiency is as follows:

$$\text{Photoelectric conversion efficiency} = J_{sc} * V_{oc} * FF$$

where $J_{sc}$ is the short-circuit photocurrent density, $V_{oc}$ is the open-circuit photovoltage, and FF is the fill factor.

The photoelectric conversion efficiency for the conventional impregnation and the supercritical fluid impregnation are compared below (Table 1), and the photoelectric conversion efficiency for the conventional impregnation and the pressure swing impregnation are compared as well (in Tables 2 to 5). Because the anode materials used in the experiments of the invention were constantly improved in manufacturing processes thereof during the experiments, measures were taken to ensure the reliability and accuracy of the resulted experimental figures, which involved carrying out a run of the conventional impregnation simultaneously with a run of the supercritical fluid impregnation or the pressure swing impregnation, so as to use the result from the conventional impregnation as a standard for indicating degrees of difference between the conventional impregnation method and the other method. The experimental results show that the photoelectric conversion efficiency for the conventional impregnation is between 5.95%~6.68%, but for the purpose of comparing the differences between the three methods easily, the ratio of efficiency for the conventional impregnation is set at 1.00 and used as a standard value for comparison.

TABLE 1

The conditions and results for the conventional impregnation and supercritical fluid impregnation using the D719 photosensitizing dye and 5 mL ethyl alcohol as the co-solvent at a temperature of 40° C.

| Method | Anode thickness (μm) | Stirring rate (rpm) | Pressure (psi) | Impregnation period (hr) | Ratio of efficiency |
|---|---|---|---|---|---|
| Conventional impregnation | 14.2 | 80 | 14.7 | 5 | 1.00 |
| Supercritical fluid impregnation | 14.1 | 80 | 1500 | 5 | 0.38 |

As indicated in Table 1, the photoelectric conversion efficiency of the supercritical fluid impregnation is not better than that of the conventional impregnation (atmospheric pressure).

The following Tables 2 to 5 list the conditions and results of the conventional impregnation process and the pressure swing impregnation process of the present invention, wherein the solvent and photosensitizing dye used were the same except the pressures were different. The pressure swing impregnation processes in Tables 2 to 3 underwent a total of 10 hours, wherein the vessel was first pressurized and maintained at 900 psi for 4.5 hours, further pressurized and maintained at 1800 psi for 0.5 hour, released to 900 psi and maintained at 900 psi for another 4.5 hours, followed by further pressurization and maintained at 1800 psi for 0.5 hour. The pressure swing impregnation process in Tables 4 to 5 underwent a total of five hours, wherein the vessel was first pressurized and maintained at 900 psi for two hours, further pressurized and maintained at 1800 psi for 0.5 hour, released to 900 psi and maintained at 900 psi for another two hours, followed by further pressurization and maintained at 1800 psi for 0.5 hour.

TABLE 2

The conditions and results for the conventional impregnation and pressure swing impregnation using the D719 photosensitizing dye and 56 mL dye solution at a temperature of 40° C.

| Method | Anode thickness (μm) | Stirring rate (rpm) | Pressure (psi) | Impregnation period (hr) | Ratio of efficiency |
|---|---|---|---|---|---|
| Conventional impregnation | 14.2 | 80 | 14.7 | 10 | 1.00 |
| Pressure swing impregnation | 14.7 | 80 | 900/1800 | 10 | 1.14 |

TABLE 3

The conditions and results for the conventional impregnation and pressure swing impregnation using the D719 photosensitizing dye and 15 mL dye solution at a temperature of 40° C.

| Method | Anode thickness (μm) | Stirring rate (rpm) | Pressure (psi) | Impregnation period (hr) | Ratio of efficiency |
|---|---|---|---|---|---|
| Conventional impregnation | 14.2 | 80 | 14.7 | 10 | 1.00 |
| Pressure swing impregnation | 14.6 | 80 | 900/1800 | 10 | 1.14 |

TABLE 4

The conditions and results for the conventional impregnation and pressure swing impregnation using the D719 photosensitizing dye and 5 mL dye solution at a temperature of 40° C.

| Method | Anode thickness (μm) | Stirring rate (rpm) | Pressure (psi) | Impregnation period (hr) | Ratio of efficiency |
|---|---|---|---|---|---|
| Conventional impregnation | 14.2 | 80 | 14.7 | 5 | 1.00 |
| Pressure swing impregnation | 14.0 | 80 | 900/1800 | 5 | 1.05 |

TABLE 5

The conditions and results for the conventional impregnation and pressure swing impregnation using the D719 photosensitizing dye and 5 mL dye solution at a temperature of 30° C.

| Method | Anode thickness (μm) | Stirring rate (rpm) | Pressure (psi) | Impregnation period (hr) | Ratio of efficiency |
|---|---|---|---|---|---|
| Conventional impregnation | 13.6 | 80 | 14.7 | 5 | 1.000 |
| Pressure swing impregnation | 13.4 | 80 | 834/1242 | 5 | 1.03 |

For a temperature of 40° C., Table 1 shows the ratio of efficiency for the supercritical fluid impregnation is 0.38, whereas Table 2 shows the ratio of efficiency for the pressure swing impregnation is 1.14; Table 3 shows the ratio of efficiency for pressure swing impregnation is 1.14, Table 4 shows the ratio of efficiency for pressure swing impregnation is 1.05. For a temperature of 30° C., Table 5 shows the ratio of efficiency for pressure swing impregnation is 1.03. As a result, it is clear to see that for the DSSC prepared from using the pressure swing impregnation, the photoelectric conversion efficiency is not only greater than that of the conventional impregnation, but also much more efficient than that of the supercritical fluid impregnation.

What is claimed is:

1. A process for impregnating a photosensitizing dye onto a conductive substrate of a photoanode, said photoanode comprising a transparent conductive substrate, a metal oxide layer deposited on a conductive surface of the conductive substrate, and a photosensitizing dye adsorbed on the metal oxide layer, said process comprising the following steps:
   a) preparing a conductive substrate having a metal oxide layer deposited on a conductive surface thereof;
   b) impregnating the metal oxide layer of the conductive substrate in a solution of photosensitizing dye in a vessel;
   c) introducing an inert gas into the vessel to maintain a first pressure therein for a period of time, wherein the solution is expanded by the inert gas; and
   d) further pressurizing the vessel with the inert gas and maintaining at a second pressure higher than the first pressure for a period of time, wherein the inert gas dissolves more into the solution, creating an anti-solvent effect, so that the photosensitizing dye is further deposited onto the metal oxide layer due to the anti-solvent effect.

2. The process of claim 1, following to step d), further comprising:
   e) repeatedly carrying out steps c) and d) in sequence by repeatedly releasing the inert gas from the vessel and introducing the inert gas into the vessel in sequence.

3. The process of claim 1, wherein said second pressure in the vessel is higher than the critical pressure of the inert gas.

4. The process of claim 1, wherein said second pressure in the vessel is lower than the critical pressure of the inert gas.

5. The process of claim 1, wherein a temperature of the inert gas in the vessel in step c) is higher than the critical temperature of the inert gas.

6. The process of claim 1, wherein a temperature of the inert gas in the vessel in step c) is lower than the critical temperature of the inert gas.

7. The process of claim 1, wherein a temperature of the inert gas in the vessel in step d) is higher than the critical temperature of the inert gas.

8. The process of claim 1, wherein a temperature of the inert gas in the vessel in step d) is lower than the critical temperature of the inert gas.

9. The process of claim 1, wherein the inert gas is carbon dioxide.

10. The process of claim 1, wherein the inert gas is carbon dioxide, the first pressure is of 300-1200 psi, and the second pressure is of 1000-3600 psi.

11. The process of claim 10, wherein step c) and d) are operated at 40° C., the first pressure is of about 900 psi, and the second pressure is of about 1800 psi.

12. The process of claim 1, wherein the period of time in step c) is of 0.50-10.0 hours, and the period of time in step d) is of 0.10-2.0 hours.

13. The process of claim 2, wherein step c) and step d) are repeatedly carried out one to three cycles in total.

14. The process of claim 1, wherein the metal oxide layer is an oxide or a mixed oxide selected from the group consisting of titanium, niobium, hafnium, indium, tin, and zinc.

15. The process of claim 1, wherein the conductive surface of the conductive substrate is a glass substrate coated with a layer of indium tin oxide (ITO), fluorine-doped tin oxide (FTO), $ZnO$—$Ga_2O_3$, $SnO_2$—$Sb_2O_3$ or a combination thereof.

16. The process of claim 1, wherein the photosensitizing dye solution is an organic solvent solution, and said organic solvent is able to dissolve the photosensitizing dye and the solution thereof is able to be expanded by $CO_2$ in Step c).

17. The process of claim 16, wherein the organic solvent is an alcohol, arene, aliphatic alkane, acetonitrile, acrylonitrile, or a mixture thereof.

18. The process of claim 17, wherein the organic solvent is an alcohol or a mixed solvent containing an alcohol.

19. The process of claim 18, wherein the organic solvent is ethyl alcohol.

20. The process of claim 1, following to step d), further comprising: d') releasing the inert gas from the vessel to a pressure inside the vessel which is about equal to the first pressure, and maintaining the pressure for a period of time.

21. The process of claim 1, following to step d), further comprising: f) releasing the inert gas from the vessel to a trap device where the solution entrained in the inert gas is collected by the trap device; g) taking out the conductive substrate from the vessel; and h) recovering the solution from the vessel and from the trap device.

22. The process of claim 2, following to step e), further comprising: f) releasing the inert gas from the vessel to a trap device where the solution entrained in the inert gas is collected by the trap device; g) taking out the conductive substrate from the vessel; and h) recovering the solution from the vessel and from the trap device.

23. The process of claim 20, following to step d'), further comprising: f) releasing the inert gas from the vessel to a trap device where the solution entrained in the inert gas is collected by the trap device; g) taking out the conductive substrate from the vessel; and h) recovering the solution from the vessel and from the trap device.

24. The process of claim 21 further comprising recycling the inert gas in the gaseous form exiting from the trap device as a source of the inert gas introduced into the vessel in step c).

25. The process of claim 22 further comprising recycling the inert gas in the gaseous form exiting from the trap device as a source of the inert gas introduced into the vessel in step c).

26. The process of claim 23 further comprising recycling the inert gas in the gaseous form exiting from the trap device as a source of the inert gas introduced into the vessel in step c).

* * * * *